Jan. 19, 1954  B. A. NOBLE  2,666,277
APPARATUS FOR FIRE FINISHING GLASS ARTICLES
Filed March 28, 1951  2 Sheets-Sheet 1

Inventor
B. A. NOBLE
By Rule and Hoge.
Attorneys

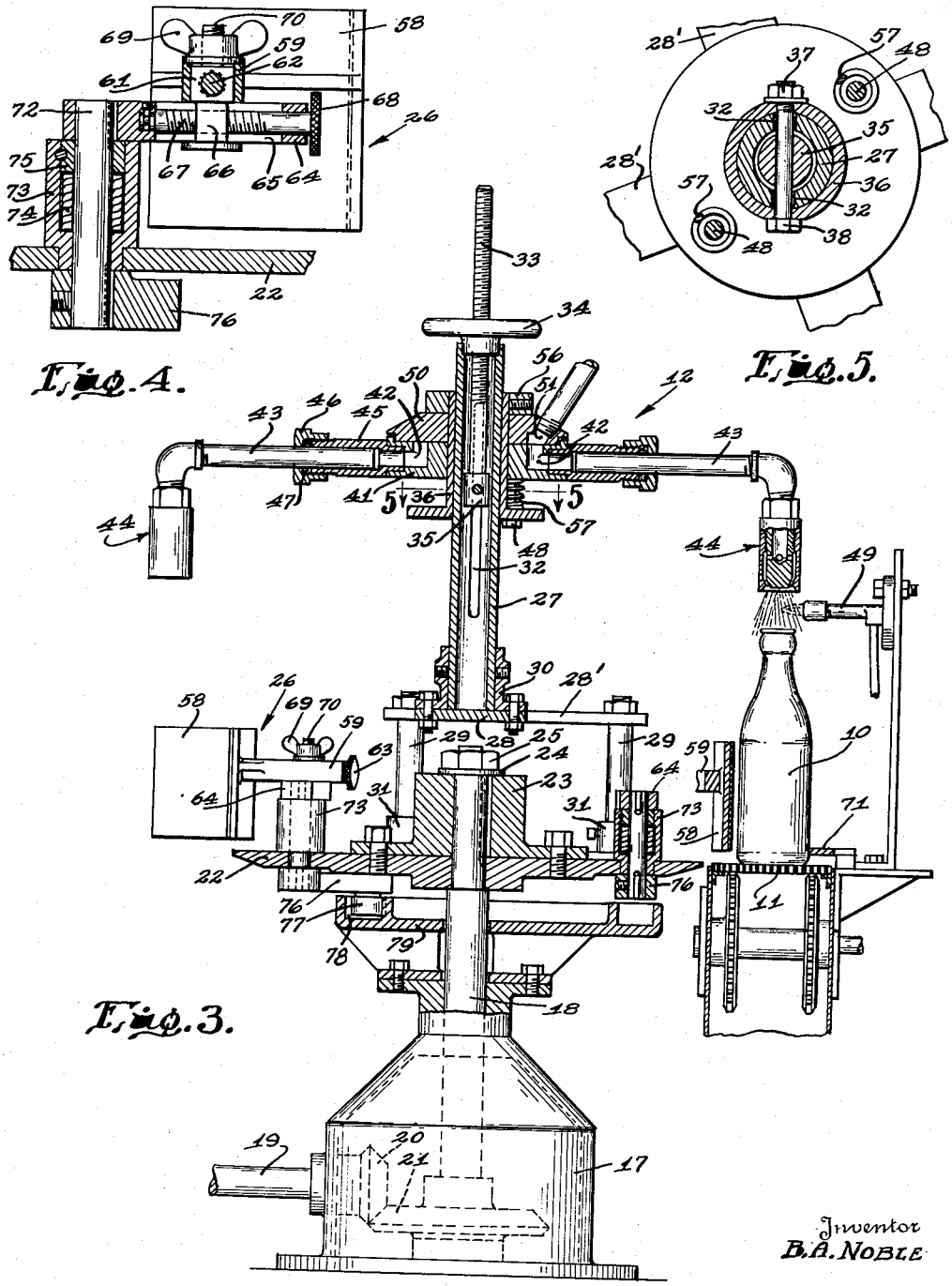

Patented Jan. 19, 1954

2,666,277

UNITED STATES PATENT OFFICE 2,666,277

APPARATUS FOR FIRE FINISHING GLASS ARTICLES

Burton A. Noble, Oakland, Calif., assignor to Owens-Illinois Glass Company, a corporation of Ohio Application March 28, 1951, Serial No. 218,040

6 Claims. (Cl. 49—58)

This invention relates to the fire-finishing of glass articles and particularly to an apparatus for fire-finishing the upper ends of bottles or glass containers.

In the forming of such bottles by the usual methods, numerous undesirable defects are formed on the upper end thereof. These defects include ridges, seams, checks and cracks. The defects interfere with the proper sealing of the bottle, in addition to providing an unsightly appearance.

A common principle employed to remedy these defects is to subject the bottles to a flame prior to their entry into the lehr. This is commonly termed "fire-polishing."

It is an object of this invention to provide an apparatus for effectively and efficiently removing these defects by applying a hot flame.

It is a further object of this invention to provide such an apparatus wherein the bottle is subjected to a minimum of handling and manipulation.

A further object is to provide such an apparatus wherein a minimum of fuel is used.

Another object is to provide such an apparatus wherein the upper end of the bottle is subjected to treatment without affecting the remainder of the bottle.

Another object of this invention is to provide an apparatus wherein the bottles are positioned in proper relationship for entry into the lehr after being subjected to the fire-polishing operation.

Other objects of the invention will appear hereinafter.

Basically, the invention provides an apparatus wherein the glass articles are guided into register with burners and are moved along in register with the burners to subject the upper ends thereof to a hot flame, the fuel being supplied to the burners only during the time when the glass articles are in register therewith. Provision is then made for properly spacing and guiding the glass articles to the lehr.

Referring to the accompanying drawings:

Fig. 3 is a part sectional elevation view at the line 3—3 on Fig. 1;

Fig. 4 is a sectional view at the line 4—4 on Fig. 1; and

Fig. 5 is a sectional view at the line 5—5 on Fig. 3.

Figure 1:
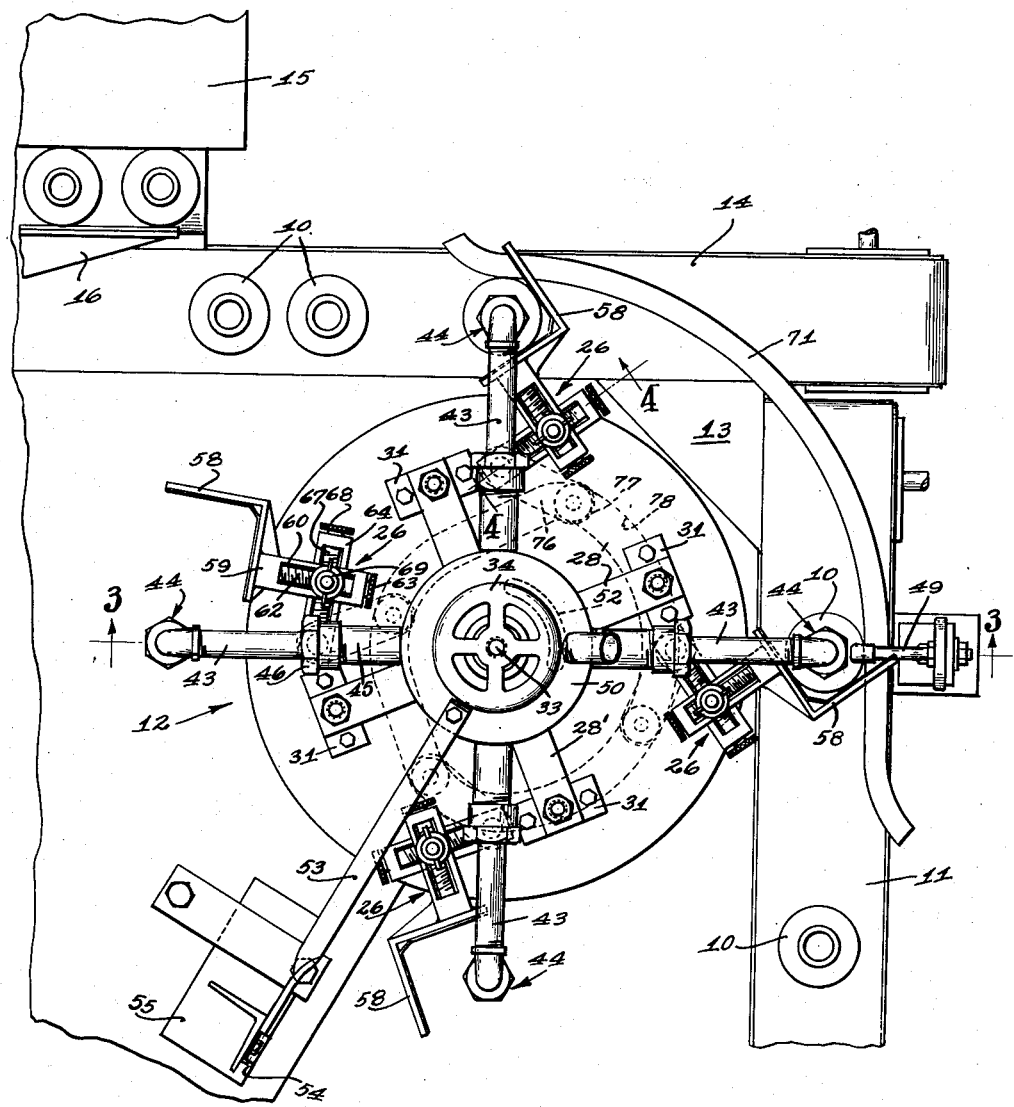
Fig. 1 is a plan view of an apparatus incorporating the invention.

Referring to Fig. 1, a bottle 10 to be fire-finished is transported by a conveyor 11 from the apparatus (not shown), which has formed it, to the fire-finishing apparatus 12. The apparatus 12 guides each bottle 10 across a supporting plate 13 to a cross conveyor 14. During this time the upper end of the bottle 10 is subjected to a hot flame which moves along in register with the bottle. The conveyor 14 carries the bottle to a position in front of a lehr 15 into which the bottles are moved by a pusher bar 16.

As shown in Fig. 3, the fire-finishing apparatus 12 includes a base 17 and a vertical shaft 18 mounted for rotation in said base. The shaft 18 is rotated by a drive shaft 19 through gearing comprising bevel gears 20, 21. A circular table 22 is mounted on the vertical shaft 18 and is held in fixed position relative to the shaft 18 by a retainer head 23 fastened to the table 22 by screws and keyed to the vertical shaft 18. A washer 24 and nut 25, screwed to the end of the shaft, hold the retainer head 23 and table 22 in a fixed vertical position.

Guiding units 26 (Figs. 1 and 3) are pivotally mounted on the table 22 and are constructed and arranged, as subsequently described, to guide the bottles during the fire-finishing operation.

A tubular shaft 27 is supported in alignment with the vertical shaft 17 by a disc 28 with radial arms 28' which in turn are held spaced above the table 22 by short rods 29. The tubular shaft 27 is fastened to the disc 28 by a flanged collar 30 connected to the disc by screws and to the tubular shaft 27 by set screws. This arrangement permits rotative adjustment of the tubular shaft 27 relative to the table 22. Each rod 29 is similarly fastened to the table 22 by a collar 31. The tubular shaft is provided with longitudinal slots 32.

A rod 33 projects downwardly into the tubular shaft and is held in vertically adjustable position therein by a handwheel 34 threaded to the upper end of the rod 33. The lower end of the rod 33 is formed with an enlarged portion 35. A sleeve 36 is provided on the shaft 27. As shown in Fig. 5, the position of this sleeve on the shaft 27 is maintained by a nut 37 (Fig. 5) and a bolt 38 projecting through holes in the sleeve, through the slots 32, and a hole in the enlarged portion of the rod 33.

A burner plate 41 is provided on the sleeve and includes burner inlets 42 extending from the upper surface thereof to pipes 43, extending radially outward to burners 44. Suitable air-tight connections are made by sleeves 45, collars 46, and gaskets 47. Each burner 44 is constructed, as shown, for example, in Fig. 3, to provide an annular flame which will project downwardly and impinge upon the circular rim of the bottle. The burner plate 41 is prevented from rotating about the sleeve 36 by studs 48 which project upwardly from the flange of the sleeve into openings in the burner plate 41.

Figure 2:
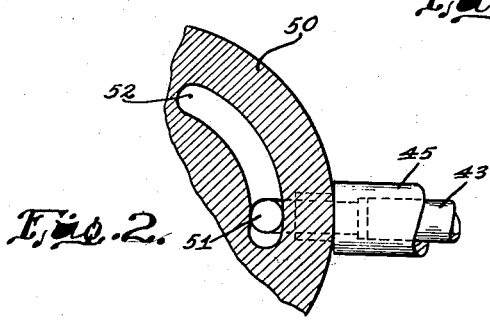
Fig. 2 is a fragmentary sectional view of the fuel distributing plate embodied in the invention.

A fuel distributing plate 50 is positioned above the burner plate 41. The distributing plate 50 has an opening 51 connected to a source of fuel, and an arc-shaped slot 52 (Fig. 2). As shown in Fig. 1, the plate 50 is prevented from rotating with the sleeve by an arm 53 fastened to the plate 50 and extending horizontally and radially beyond the periphery of the table 22 and into a vertical slot 54 on a stationary bracket 55. By this arrangement, the plate 50 may be adjusted vertically but is prevented from rotating.

A collar 56 surrounds the upper portion of the sleeve 32 and is fastened thereto by a set screw. Springs 57 surrounding the studs 48 push the burner plate 41 upwardly into gas-tight contact with the fuel distributing plate 50.

With the above described construction, the table 22 as it rotates will carry with it the tubular shaft 27, the sleeve 36 and the burner plate 41. As the burner plate rotates beneath the stationary fuel distributing plate 50, the burner inlets 42 are brought in succession into communication with the arc-shaped slot 52 in the distribution plate 50 (Fig. 2) thereby periodically providing fuel to each burner. The position of the slot 52 is such that fuel is supplied to each burner only during the time when the bottles are in register therewith, as presently described.

A pilot burner 49 (Fig. 1) is mounted on a stationary bracket adjacent to the path of the burners in order to ignite the fuel as soon as it is supplied to the burners.

The means for guiding and maintaining the bottles in register with the burners during a portion of the travel of the burners comprises a guide rail 71 and the pushing and guiding units 26. Referring to Fig. 4, each of these units 26 includes a cup or paddle 58 connected to a carrier therefor including a bar 59. The bar 59 is provided with a slot 60 and a block 61 is provided for sliding movement in the slot. A screw 62 is threaded through the block 61 to adjust the position thereof in the slot 60. The screw 61 is journalled in the bar and is provided with adjusting knob 63. The carrier for the paddle 58 includes a second bar 64 positioned below the bar 59 and similarly constructed with a slot 65, block 66 permanently fastened to the block 61, and slidable in the slot 65, screw 67 and knob 68 for adjusting the position of the second bar 64. The two bars 59 and 64 are locked together by a wing nut 69 and bolt 70 formed on the upper part of the block 61.

The second bar 64 is keyed to a short shaft 72 projecting through an opening in the table 22. A spacer 73 is provided between the bar and the table 22. Helical roller bearings 74 surround the shaft 72 to prevent any binding or hindering of the pivoting action of the guiding units. A bearing retainer ring 75 is provided above the bearings.

An arm 76 is keyed to the lower end of the shaft 72 below the table 22. A cam follower 77 (Fig. 3) is provided on the end of the arm 76 and rides in a closed cam track 78 in a cam 79 mounted below the table on the stationary base 17.

As shown by dotted lines in Fig. 1, the configuration of the cam track is such as to swing each pushing and guiding unit 26 and cause a paddle 58 to contact a bottle 10 on the conveyor 11, and maintain and move it in register with a burner 44 across the plate 13 to the conveyor 14. The paddle is shaped to provide two upright contacting faces substantially at right angles to form a recess or pocket for receiving the bottle and cooperating with the stationary guide rail 71 in maintaining the bottle in upright position and in its arc of travel concentric with the rotating table 22.

Inasmuch as the bottles should be closely spaced on the conveyor 14 in order to obtain efficient loading of the lehr, the conveyor 14 is run at a slower speed than the peripheral speed of the pushing and guiding units 26. It therefore becomes necessary to swing the paddles 58 out of contact with the bottles on the conveyor 14 to prevent their pushing the bottles off the conveyor. To accomplish this, the configuration of the cam track is such that the guiding units are pivoted clockwise as soon as the bottle is brought to position on the conveyor 14.

The operation of the apparatus may be summarized as follows:

As a bottle 10 is carried into position by the conveyor 11, the continuously rotating fire-finishing apparatus operates to bring a paddle into position to hold the bottle in register with a burner 44. At this time the burner inlet 42 is brought into communication with the slot 52 in the fuel distributing plate 50. Fuel is thereby supplied to the burner. When this occurs the burner is in register with the bottle and adjacent to the pilot burner 49, thereby igniting the fuel.

Upon further rotation of the table the bottles are moved along in register with the burners until they are deposited on the conveyor. The paddles then swing away from the bottle and simultaneously the fuel to the burner is cut off since the burner inlet 42 moves out of communication with the slot 52. The bottles are then carried to the lehr 15.

The fuel may be of any type which will produce a flame having a very intense heat. Mixtures of oxygen and natural gas, oxygen and acetylene, and oxygen, natural gas, and air give satisfactory results. By using such mixtures in burners which provide an annular flame, the heat is localized and restricted to the desired portions of the bottle, thus preventing the undesired treatment of the remainder of the bottle and eliminating the possibilities of distorting or changing the bottle shape.

The apparatus may be readily adjusted for bottles or glass articles of different sizes by loosening the nut 37 and bolt 38 and rotating the handwheel 34. Accurate and minute adjustment of the position of the paddles 58 may be accomplished by loosening the wing nut 69 and rotating the knobs 63 and 68.

The method and apparatus described provide an effective and efficient fire-polishing of glass articles. By moving the burners in register with the glass articles, the relative relationship of the flame to the glass article is maintained and the satisfactory fire-polishing of only the portions desired is insured.

A great fuel saving is accomplished since the fuel is supplied periodically to the burners. A further fuel saving is obtained by moving the burners in register with the glass articles.

An additional feature of the invention is that the articles are positioned in proper relationship for entry into the lehr after the fire-polishing operation.

Modifications may be resorted to within the spirit and scope of the appended claims.

I claim:

1. An apparatus for fire-finishing glass articles comprising a circular table mounted for rotation about a vertical axis, a series of guiding devices pivotally mounted on said table, a burner plate mounted for rotation about the axis of the table, means for rotating said table and said burner plate, a series of pipes extending radially from said plate, a burner mounted on each of said pipes, a stationary fuel distributing plate mounted with one face thereof bearing against one face of said burner plate for relative sliding movement of said plates, said distributing plate being provided with an arc-shaped channel, the position of said channel being such that each burner pipe comes into communication therewith when the burner plate is rotated thereby supplying fuel to each burner, an arm attached to each said guiding device, a cam follower on each of said arms, a stationary cam surrounding the vertical axis of the table, the configuration of said cam being such as to swing each guiding device during the rotation of the table to bring and maintain said guiding device in register with a burner for a portion of the path of the burners, said registration of the guiding devices and burner occurring during the portion of the path of the burner when fuel is being supplied to the burner.

2. An apparatus for fire-finishing glass articles comprising a table mounted for rotation about a vertical axis, a series of article pushing and guiding devices pivotally mounted on said table, a series of burners mounted to travel in a closed path about said vertical axis, means for rotating the table and driving said burners, said pushing and guiding devices comprising upright contacting surfaces for engagement with the upright surfaces of articles in register with the burners, means for pivotally moving the pushing and guiding devices for swinging movement relative to the table during the rotation of the table into register with the burners during a portion of the closed path of the burners and with said contact surfaces positioned behind and in contact with the said articles, and means for supplying combustible fuel to said burners when the pushing and guiding devices are in register with the burners.

3. The combination set forth in claim 2, the said burners being positioned radially beyond the periphery of the table.

4. The apparatus set forth in claim 3 and in combination therewith, a stationary guide rail substantially concentric with the said axis of the table and located radially beyond the table in position to contact and guide the articles during the fire-finishing.

5. An apparatus for fire-finishing glass articles comprising a table mounted for rotation about a vertical axis, a series of pushing and guiding devices each comprising an upright paddle having vertical contact surfaces and a carrier to which the paddle is attached, said carriers being pivotally mounted on the table for swinging movement of the paddles relative to the table, a series of burners mounted to travel in a closed path about said vertical axis, means connecting the burners for rotation with the table, means for rotating the table and thereby causing said travel of the burners, cam followers on said carriers, a stationary cam on which said followers run, said cam shaped to swing said carriers and thereby move the pushing and guiding devices into register with the burners during the rotation of the table with said contact surfaces behind and in engagement with the articles in register with the burners, and means for supplying combustible fuel to the burners during the portion only of the path of the burners when the pushing and guiding devices are in register with said burners and thereby applying a fire-finishing flame to the said articles while the pushing and guiding devices are in register with the burners.

6. The combination set forth in claim 5, the said burners and article contacting surfaces of said pushing and guiding devices being positioned radially beyond the periphery of the table and thereby providing means for pushing and guiding the articles independently of the rotating table.

BURTON A. NOBLE.

References Cited in the file of this patent

UNITED STATES PATENTS

| Number | Name | Date |
| --- | --- | --- |
| 1,245,730 | Johnson et al. | Nov. 16, 1917 |
| 1,502,201 | Jaeger | July 22, 1924 |
| 2,209,252 | Stewart et al. | July 23, 1940 |
| 2,258,408 | Cozzoli | Oct. 7, 1941 |
| 2,338,841 | Fedorchak et al. | Jan. 11, 1944 |
| 2,381,798 | Benoit | Aug. 7, 1945 |
| 2,407,878 | Greetham | Sept. 17, 1946 |